United States Patent

[11] 3,632,470

| [72] | Inventors | Bernard F. Rubin<br>Palo Alto;<br>Charles L. Larson, Sunnyvale; Leonard N. Grossman, Livermore, all of Calif. |
|---|---|---|
| [21] | Appl. No. | 729,317 |
| [22] | Filed | May 15, 1968 |
| [45] | Patented | Jan. 4, 1972 |
| [73] | Assignee | General Electric Company |

[54] REACTOR FUEL LEAK DETECTION
14 Claims, 2 Drawing Figs.

[52] U.S. Cl............................................ 176/19, 176/68
[51] Int. Cl............................................ G21c 17/04, G21c 3/16
[50] Field of Search.................................. 176/19, 19 LD, 68, 37

[56] References Cited
UNITED STATES PATENTS
3,178,355   4/1965   Jacobs............................ 176/19

FOREIGN PATENTS
1,184,573   7/1959   France ......................... 176/68
891,179    3/1962   Great Britain................ 176/68
938,352   10/1963   Great Britain................ 176/19 LD

*Primary Examiner*—Carl D. Quarforth
*Assistant Examiner*—Harvey E. Behrend
*Attorneys*—Ivor J. James, Jr., Samuel E. Turner, John R. Duncan, Frank L. Neuhauser, Oscar B. Waddell and Melvin M. Goldenberg ABSTRACT: A method of detecting ruptured fuel element cladding in nuclear reactors which permit radioactive material to leak therefrom is disclosed. Varying proportions of two stable isotopes of an inert indicating gas are added to the inert filler gas in fuel elements. Each subassembly or group of fuel elements contains a specific individual combination of the gases. Mass spectrometric analysis of the reactor cover gas or off-gas will detect the indicating gas and determine the isotopic ratio thereof to indicate which subassembly contains a leaking fuel element.

INVENTORS:
BERNARD F. RUBIN
CHARLES L. LARSON
LEONARD N. GROSSMAN

BY: *John R Duncan*
ATTORNEY

REACTOR FUEL LEAK DETECTION

BACKGROUND OF THE INVENTION

Nuclear chain fission reactions and the reactors in which they take place are now well known. A typical nuclear reactor includes a chain-reacting assembly or core made up of nuclear fuel material contained in fuel elements. The fuel material is encased in a corrosion-resistant heat-conductive shell or cladding. The reactor core, made up of a plurality of these clad fuel bodies in spaced relationship, is enclosed in a container through which the reactor coolant flows. As the coolant passes between the spaced clad fuel bodies, it is heated by thermal energy released in the fuel material during the fission reaction. The heated coolant then leaves the reactor, the thermal energy is used to perform useful work and the now-cooled coolant is recycled back to the reactor.

A wide variety of nuclear reactor designs have been developed. Many of these designs are described in detail in Nuclear Power Plants, by R. L. Loftness, D. Van Nostrand Company (1965).

In most modern commercial power reactors, such as those described in U.S. Pat. No. 3,029,197, the core is generally made up of a plurality of subassemblies or bundles, each of which consists of a plurality of rod-shaped fuel elements held in a spaced parallel arrangement.

Each clad fuel body contains fissile material, such as $U^{235}$, $U^{233}$, or $Pu^{239}$ together with an inert material and/or a fertile material such as $Th^{232}$ or $U^{238}$. Neutron bombardment of the fertile isotopes $Th^{232}$ and $U^{238}$ will produce fissile $U^{233}$ and $Pu^{239}$, respectively. The life of the fuel load will be prolonged because these created fissile materials will then fission. Where more fissile material is produced by this conversion than is consumed, the reactor is referred to as a "breeder."

The fuel material is encased in a protective cladding of a metal such as a zirconium alloy, stainless steel, aluminum, magnesium, etc. The exterior surface of the cladding is in contact with a flowing stream of coolant and/or moderator, which may typically be water, steam, an organic composition such as terphenyl isomers, a liquid metal such as molten sodium, etc.

The cladding serves two primary purposes; first, to resist any chemical reaction between the nuclear fuel and the coolant and/or moderator, and second, to prevent the highly radioactive fission products from being released into the coolant and/or moderator.

Failure of the cladding, such as by localized melting or cracking, may contaminate the coolant or moderator and the coolant system with intensely radioactive long-lived fission products to a degree which interferes with plant operation and maintenance. External equipment, such as heat exchangers or turbines, through which the coolant passes may become contaminated.

In a liquid-cooled system, reactor off-gases must be collected and disposed of. In water- or steam-cooled systems, these off-gases are primarily oxygen and hydrogen resulting from radiolytic decomposition of water. If these off-gases become severely contaminated by radioactive fission gases leaking from clad fuel bodies, safe disposition of the off-gases becomes difficult.

Conventionally, the gross radioactivity of the reactor coolant and/or off-gases is monitored during operation. An abrupt rise in radioactivity indicates that a cladding leak has occurred somewhere in the system. The reactor is generally shut down before excessive coolant contamination occurs. The gross activity monitoring system does not, of course, indicate which of the many fuel subassemblies contains the leaking clad fuel body.

Attempts have been made in the past to continuously or intermittently sample the coolant exiting each subassembly in the reactor and to then monitor the radioactivity of each sample in a sample room located away from the reactor. This procedure, however, requires either the penetration of the reactor vessel by a large number of sample lines or the use of multivalve manifolds or mechanically complex remotely operated multiport valves located within the reactor vessel which successively sample coolant leaving each of the many subassemblies. If sampling is performed intermittently, gross failure may occur, resulting in serious contamination of the coolant, during the period between sampling operations on a given fuel subassembly. On the other hand, continuous sampling and testing of the sample from each of several hundred subassemblies requires a very large amount of equipment, a complex array of sampling lines and complex analysis equipment.

It is extremely important that leakage from clad fuel bodies be detected as early as possible, before massive rupture of the cladding and attendant gross contamination of the coolant occurs. Early detection of leakage from clad fuel bodies is of special importance in reactors cooled with liquid sodium. The liquid metal is expensive and difficult to handle, since it must be kept molten by heating and must be kept out of contact with water or air. Thus, decontamination of heavily contaminated liquid sodium is extremely difficult. Many of the prior failure detection systems are insensitive to the early, slight leakage and where sampling is intermittent may have an undesirably long period between samples.

There remains a continuing need for improved methods of detecting leaks from clad fuel bodies in reactors and for identifying the subassembly containing the leaking clad fuel body.

SUMMARY OF THE INVENTION

It is, therefore, an object of this invention to provide an improved fuel-cladding leak detection system which overcomes the above-noted problems.

Another object of this invention is to provide a fuel-cladding leak detection system capable of simultaneously monitoring a large number of fuel subassemblies.

Another object of this invention is to provide a fuel-cladding leak detection system of improved sensitivity and discrimination.

Still another object of this invention is to provide a fuel-cladding leak detection system useful within a wide variety of reactor types.

The above objects, and others, are accomplished in accordance with this invention by providing within each clad fuel body or group of clad fuel bodies a different identifiable mixture of certain gases. Gases leaking into the reactor coolant may be collected and analyzed to determine their composition, thus indicating the leaking clad fuel body.

In a preferred embodiment, mixtures of an inert filler gas and an indicating gas consisting of varying proportions of two stable isotopes of another inert gas are placed in the clad fuel bodies. Typical clad fuel bodies comprise an elongated closed tube substantially filled with fuel material in pellet or granular form. A plenum chamber is left at one end of the tube to collect fission product gases given off by the fuel during operation in the reactor. Such clad fuel bodies are described in further detail, for example, in U.S. Pat. No. 3,365,371. The plenum chamber is filled with the mixture of filler and indicating gases in accordance with this invention. Generally, all of the clad fuel bodies in a single bundle or subassembly may contain the same gas mixture, since it is usually sufficient to identify the subassembly containing a leaking clad fuel body so that the subassembly may be removed from the reactor core. The gas mixture must contain elements and/or isotopes which are not adversely affected by irradiation during the life of the fuel in the reactor. The gases should preferably have a low neutron absorption cross section and high thermal conductivity.

Any suitable inert gas may be used as the filler gas. Typical inert gases include helium, neon, argon, krypton, and mixtures thereof. Helium is preferred, since it is readily available and has high thermal conductivity, thus aiding heat transfer from the fuel in the fuel element to the cladding.

The filler gas may fill both the plenum space and interstices between fuel and the cladding, as in the above gas-bonded fuel elements or may fill only the plenum space, as in sodium-bonded fuel elements where the gap between fuel and the cladding is sodium filled. The bonding metal may comprise any suitable composition. Sodium, potassium, and mixtures thereof are preferred because of their excellent heat transfer properties.

The identifying gas to be added to the filler gas should be inert and nonreactive with the fuel material, the cladding and the coolant, must be separable from the coolant and from any cover gas used over the coolant and it should have a reasonably high thermal conductivity so as not to seriously adversely affect the thermal behavior of the fuel rods. Neon has been found to meet these requirements to a high degree. Neon has three naturally occurring isotopes, $Ne^{20}$, $Ne^{21}$ and $Ne^{22}$. These isotopes are stable and naturally occurring, with about 91 percent of natural neon in the $Ne^{20}$ isotope and about 8 percent in the $Ne^{22}$ isotope. The separation of these isotopes is relatively simple and both $Ne^{20}$ and $Ne^{22}$ are available commercially at reasonable prices. Mass spectrometric analysis of isotopic ratios may readily be performed to within 0.5 percent of the neon concentration, so that $Ne^{20}/Ne^{22}$ ratios varying by 1 percent of the total neon concentration may be discerned. Thus, 101 different compositions may be prepared, ranging through 100 $Ne^{20}$/0 percent $Ne^{22}$ to 50 percent $Ne^{20}$/50 percent $Ne^{22}$ to 0 percent $Ne^{20}$/100 percent $Ne^{22}$. Typically, the fuel rod filler gas could comprise 90 percent He and 10 percent of a mixture of $Ne^{20}$ mixture and $Ne^{22}$. Similar ratios could be established with 15 or 20 percent $Ne^{20}/Ne^{22}$ mixture and 85 or 80 percent He. A 5 percent difference in He/Ne ratio from one group to another is sufficient, since the very small amount of helium generated in the fission reaction in the fuel should not change the helium quantity by more than 1–2 percent.

This system, using a mixture of helium and two neon isotopes is preferred, since it is effective, the isotopes are readily available at reasonable cost, and the concentration ratios will not be significantly distorted by fission product gases generated in the fuel.

Of course, other mixtures of inert gases and their isotopes may be used, where suitable. For example, helium occurs in the form of two stable isotopes, $He^3$ and $He^4$ (although very little $He^3$ occurs naturally) and argon occurs in the form of three stable isotopes, $Ar^{36}$, $Ar^{38}$ and $Ar^{40}$.

The off-gases from the reactor core are desirably monitored continuously with a continuous mass spectrograph. Thus, if a first leak is detected, and later a second leak develops, it can be detected by the change in isotope ratio. Since generally months will pass between leaks, the probability of two rods beginning to lead at the same instant is so low as to be beyond credibility.

Alternatively, the reactor cover gas may be continuously monitored to detect an increase in concentrations of noble gas fission products such as $Xe^{133}$ leaking from a failed fuel element. Typically, a scintillation detector and multichannel analyzer may be used. Periodic samples of the cover gas, taken before and after the failure indication may be analyzed by a mass spectrograph to determine the neon or other identifying gas ratio and thus locate the failure.

This fuel element leak detecting system may be used in any suitable type of nuclear reactor. For example, in a boiling water reactor, off-gases taken off at the main condenser, which primarily contain radiolytically formed hydrogen and oxygen, may be analyzed by mass spectrometry to detect the above-described filler and indicating gases leaking from a fuel element. In a liquid-metal cooled fast breeder reactor generally an inert cover gas, such as argon, blankets the reactor core. This cover gas may be analyzed for the presence of the gas mixture from a leaking fuel element. Similarly, in a reactor cooled by a gas, such as steam or carbon dioxide, the coolant stream may be analyzed.

BRIEF DESCRIPTION OF THE DRAWING

Details of the invention will be further understood upon reference to the drawing, wherein.

DETAILED DESCRIPTION OF THE INVENTION

Figure 1:
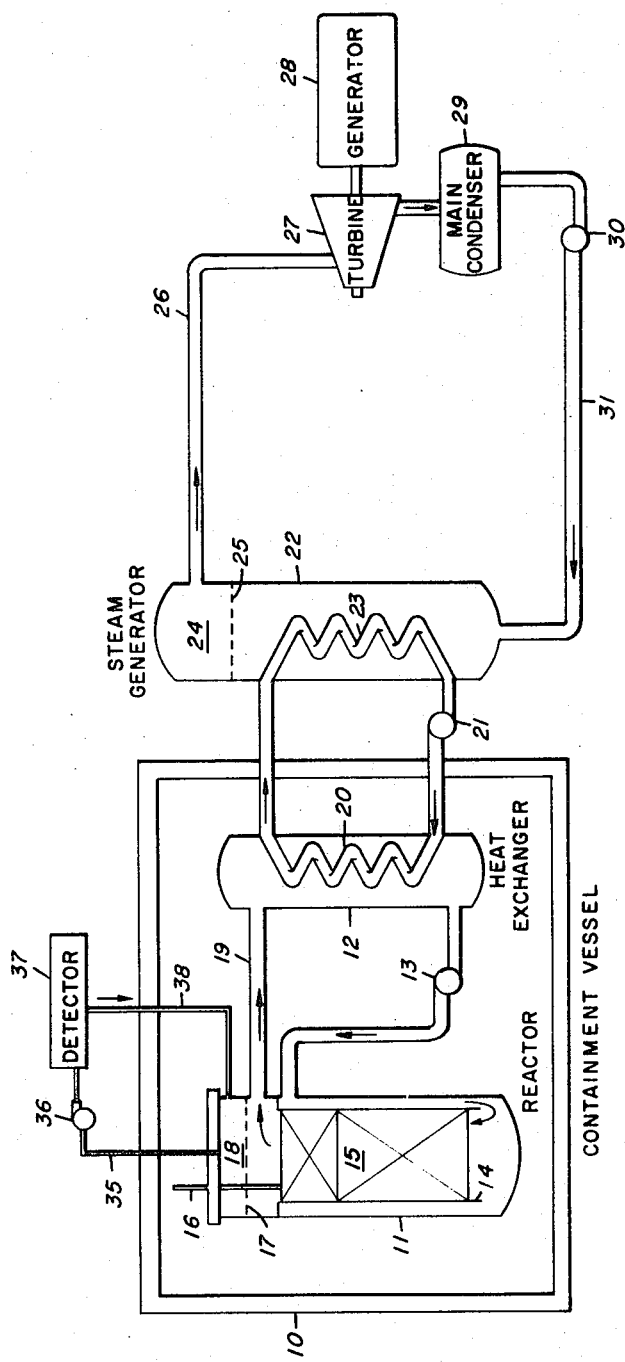
FIG. 1 shows a schematic flowsheet illustrating a power reactor system of the liquid-metal cooled type, incorporating the fuel element leak detection system of this invention.

Referring now to FIG. 1, there is seen a containment vessel 10 enclosing a nuclear reactor 11 and a heat exchanger 12. Liquid sodium is pumped by pump 13 into reactor 11 where it passes downwardly in an annular space between shroud 14 and the wall of reactor 11. The sodium then passes upwardly through core 15 which is made up of a plurality of spaced clad fuel bodies where it is heated by thermal energy given off in the fuel. The reactivity of core 15 is controlled by a plurality of control rods, one of which is schematically indicated at 16. The level of sodium within reactor 11 is indicated by dashed line 17. Above this liquid sodium surface is a cover gas space 18, typically filled with argon.

The heated sodium passes through line 19 to heat exchanger 12. The sodium from reactor 11 gives up heat to a second sodium stream which is pumped through coil 20 in heat exchanger 12 by pump 21. The cooled reactor sodium is recycled to reactor 11 by pump 13, as described above.

The now-heated second sodium stream passes to steam generator 22 where the sodium in coil 23 is brought into indirect heat-exchange relationship with water to produce steam. The cooled sodium is recycled to heat exchanger 12 by pump 21, as described above.

Steam formed in steam generator 22 rises to steam space 24 above the water line indicated by the dashed line at 25. The steam passes through line 26 to turbine 27 which drives electrical generator 28. Steam leaving turbine 27 is condensed in main condenser 29 and pumped by pump 30 through line 31 back to the steam generator.

Radioactive material leaking from fuel elements in core 15 will contaminate the sodium coolant, reactor equipment, heat exchanger 12 and associated pumps and piping. The reactor and heat exchanger have been greatly simplified in the showing of FIG. 1, for clarity. In practice they are mechanically complex. From time to time it is necessary to open the reactor for refueling and/or repair. Intense radioactive contamination makes these operations very difficult. In liquid-metal cooled reactor, sampling and analyzing coolant leaving each fuel subassembly is especially difficult because of the requirement that the sodium be maintained above its melting temperature and because sodium is a hazardous material to handle.

In accordance with the present invention, a stream of the cover gas from cover gas space 18 is pumped through line 35 by pump 36 to a detector station 37. A portion of the gas stream is continuously or intermittently analyzed by a mass spectrometer for the presence of the filler and indicating gases included in the fuel rods in core 15. Typically, the mass spectrometer may be designed to print a continuous gas analysis in graphic form. If desired, an alarm system may be included, triggered by detection of the filler and indicating gases in the cover gas stream. Since only a small fraction of the cover gas passing through detector station 37 is consumed in the analysis, the remainder is returned to cover gas space 18 through line 38.

This is an exceptionally simple, sensitive, and accurate fuel element leak detection system. The system does not add complex sampling equipment within the already crowded reactor vessel. The detection equipment is almost entirely located outside the reactor containment, where it can be repaired or modified as necessary without shutting down the reactor. Redundancy may be provided by merely providing two detection stations 37, so that monitoring may continue while one detection station is inoperative.

Figure 2:
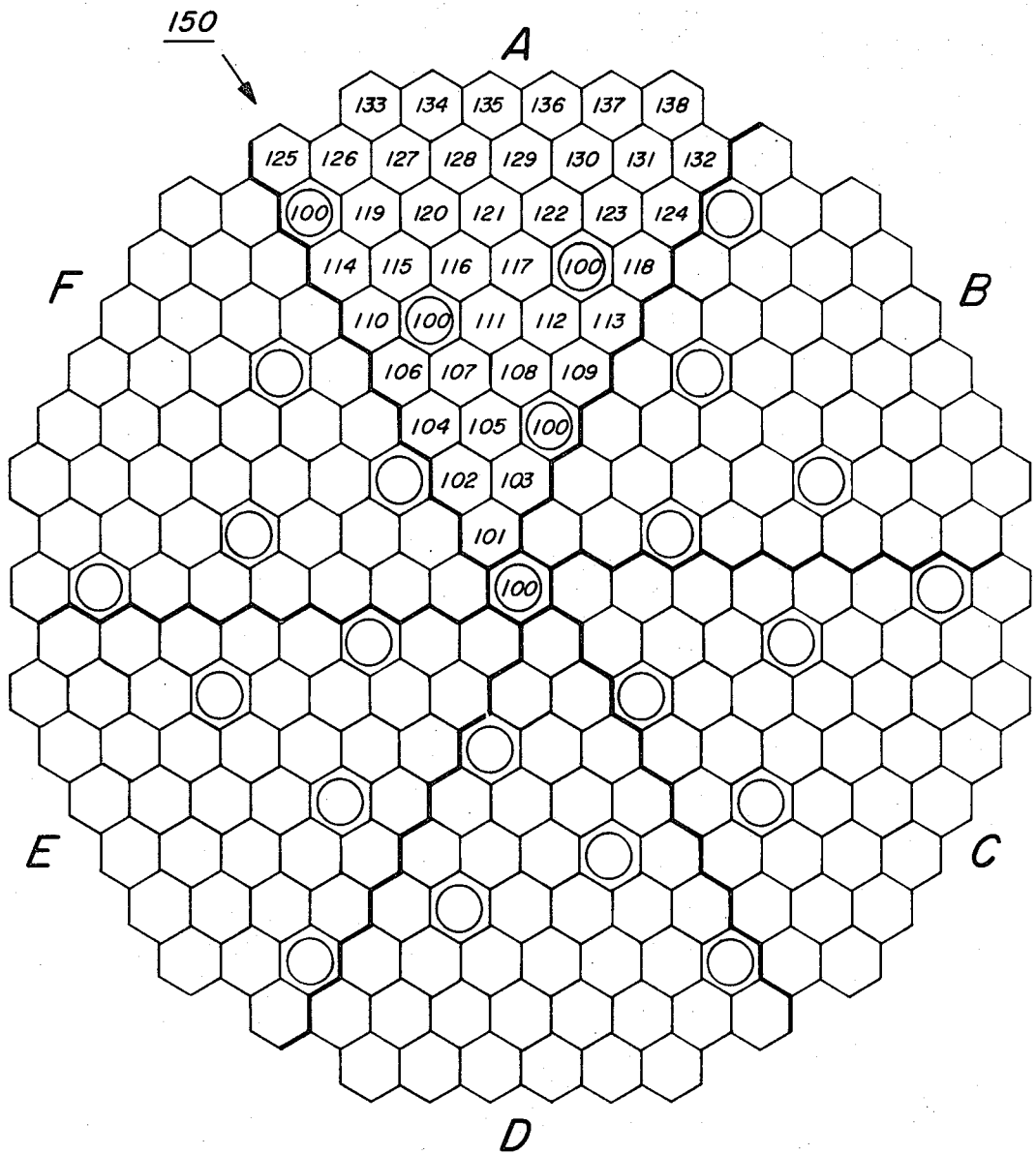
FIG. 2 shows a schematic representation of a typical reactor core, illustrating the distribution of indicating gas mixtures according to this invention.

FIG. 2 shows a schematic representation of a horizontal section through a reactor core, of the sort useful in a system such as that shown in FIG. 1, showing the arrangement of fuel bundles therein. As seen in FIG. 2, the fuel subassemblies or bundles have a hexagonal cross section. Of course, the bundles may have any other suitable cross section, such as square, rectangular, etc. The subassemblies are arranged in abutting relationship to form an overall core 150 having a generally cylindrical shape.

Core 150 has been divided into six segments, identified by letters A through F. Heavy lines delineate the segments, for clarity. The segments have rotational symmetry, that is, each segment is identical with segment A, if rotated about the core center into the position occupied by segment A. The fuel subassemblies within segment A have been numbered 101 through 138. Corresponding fuel subassemblies in segments B through F have corresponding numbers, although the numbers have been omitted from FIG. 2, for clarity. Several control elements 100 are spaced at various locations within core 110. These control elements 100 are conventional, vertically movable, neutron-absorbing members.

Since there are 38 fuel subassemblies in segment A, there are 228 fuel subassemblies within core 150. Thus, there must be 228 different combinations of indicating isotope ratios and/or indicating/filler gas ratios to permit positive identification of a subassembly containing a leaking rod by analysis of the core off-gas. Of course, other core designs may have fewer or many more fuel subassemblies. The system of this invention is capable of providing many hundred identifiable gas mixtures to accommodate any anticipated core design.

Many different combinations of gases and isotopes may be used in the fuel subassemblies. Tables I and II below point out two of these arrangements.

In table I, below, the gas mixture consists of helium as the filler gas and a mixture of neon-20 and neon-22 as the indicating gas. The matrix shown in table I has subassembly numbers within each segment on the vertical axis, with columns for each lettered segment within core 110. Each column shows first the weight percent helium in the mixture, the balance being neon and second the weight percent of the neon-20, neon-22 mixture which is neon-20, the balance, of course,
being neon-22. Thus, a typical fuel subassembly in segment C, number $C^{112}$ in table I, might contain a gas mixture consisting of 90 percent helium and 10 percent neon, the neon portion consisting of 87 percent neon-20 and 13 percent neon-22.

As can be seen from table I, above, by using the full 101 combinations of neon-20, neon-22 at 1 percent increments, only three different ratios of helium to neon are required using 5 percent increments. This is advantageous, since helium has a higher thermal conductivity than neon, and is, therefore, preferred for best heat transfer characteristics.

Another possible arrangement is illustrated in table II below. Here, the subassemblies having the same number in each lettered segment have the same neon-20, neon-22 ratio. However, each segment as a whole has a same neon-20, neon-22 ratio. All of the subassemblies in each segment have the same helium/neon ratio. However, each segment as a whole has a helium/neon ratio different from the other segments.

TABLE II

| Subassembly Number | Percent Neon-22 | Percent Neon-20 | Subassembly Number | Percent Neon-22 | Percent Neon-20 |
|---|---|---|---|---|---|
| 101 | 0 | 100 | 120 | 19 | 81 |
| 102 | 1 | 99 | 121 | 20 | 80 |
| 103 | 2 | 98 | 122 | 21 | 79 |
| 104 | 3 | 97 | 123 | 22 | 78 |
| 105 | 4 | 96 | 124 | 23 | 77 |
| 106 | 5 | 95 | 125 | 24 | 76 |
| 107 | 6 | 94 | 126 | 25 | 75 |
| 108 | 7 | 93 | 127 | 26 | 74 |
| 109 | 8 | 92 | 128 | 27 | 73 |
| 110 | 9 | 91 | 129 | 28 | 72 |
| 111 | 10 | 90 | 130 | 29 | 71 |
| 112 | 11 | 89 | 131 | 30 | 70 |
| 113 | 12 | 88 | 132 | 31 | 69 |
| 114 | 13 | 87 | 133 | 32 | 68 |
| 115 | 14 | 86 | 134 | 33 | 67 |
| 116 | 15 | 85 | 135 | 34 | 66 |
| 117 | 16 | 84 | 136 | 35 | 65 |
| 118 | 17 | 83 | 137 | 36 | 64 |
| 119 | 18 | 82 | 138 | 37 | 63 |

| Segment | Percent Neon mixture | Percent Helium | Segment | Percent Neon mixture | Percent Helium |
|---|---|---|---|---|---|
| A | 5 | 76 | D | 20 | 80 |
| B | 10 | 90 | E | 25 | 75 |
| C | 15 | 85 | F | 30 | 70 |

TABLE I

| Subassembly No. | Segment (percent) | | | | | | | | | | | |
|---|---|---|---|---|---|---|---|---|---|---|---|---|
| | A | | B | | C | | D | | E | | F | |
| | Helium | Neon-20 | Helium | Neon-20 | Helium | Neon-20 | Helium | Neon-22 | Helium | Neon-22 | Helium | Neon-22 |
| 101 | 90 | 0 | 90 | 38 | 90 | 76 | 85 | 14 | 85 | 52 | 85 | 90 |
| 102 | 90 | 1 | 90 | 39 | 90 | 77 | 85 | 15 | 85 | 53 | 85 | 91 |
| 103 | 90 | 2 | 90 | 40 | 90 | 78 | 85 | 16 | 85 | 54 | 85 | 92 |
| 104 | 90 | 3 | 90 | 41 | 90 | 79 | 85 | 17 | 85 | 55 | 85 | 93 |
| 105 | 90 | 4 | 90 | 42 | 90 | 80 | 85 | 18 | 85 | 56 | 85 | 94 |
| 106 | 90 | 5 | 90 | 43 | 90 | 81 | 85 | 19 | 85 | 57 | 85 | 95 |
| 107 | 90 | 6 | 90 | 44 | 90 | 82 | 85 | 20 | 85 | 58 | 85 | 96 |
| 108 | 90 | 7 | 90 | 45 | 90 | 83 | 85 | 21 | 85 | 59 | 85 | 97 |
| 109 | 90 | 8 | 90 | 46 | 90 | 84 | 85 | 22 | 85 | 60 | 85 | 98 |
| 110 | 90 | 9 | 90 | 47 | 90 | 85 | 85 | 23 | 85 | 61 | 85 | 99 |
| 111 | 90 | 10 | 90 | 48 | 90 | 86 | 85 | 24 | 85 | 62 | 85 | 100 |
| 112 | 90 | 11 | 90 | 49 | 90 | 87 | 85 | 25 | 85 | 63 | 80 | 1 |
| 113 | 90 | 12 | 90 | 50 | 90 | 88 | 85 | 26 | 85 | 64 | 80 | 2 |
| 114 | 90 | 13 | 90 | 51 | 90 | 89 | 85 | 27 | 85 | 65 | 80 | 3 |
| 115 | 90 | 14 | 90 | 52 | 90 | 90 | 85 | 28 | 85 | 66 | 80 | 4 |
| 116 | 90 | 15 | 90 | 53 | 90 | 91 | 85 | 29 | 85 | 67 | 80 | 5 |
| 117 | 90 | 16 | 90 | 54 | 90 | 92 | 85 | 30 | 85 | 68 | 80 | 6 |
| 118 | 90 | 17 | 90 | 55 | 90 | 93 | 85 | 31 | 85 | 69 | 80 | 7 |
| 119 | 90 | 18 | 90 | 56 | 90 | 94 | 85 | 32 | 85 | 70 | 80 | 8 |
| 120 | 90 | 19 | 90 | 57 | 90 | 95 | 85 | 33 | 85 | 71 | 80 | 9 |
| 121 | 90 | 20 | 90 | 58 | 90 | 96 | 85 | 34 | 85 | 72 | 80 | 10 |
| 122 | 90 | 21 | 90 | 59 | 90 | 97 | 85 | 35 | 85 | 73 | 80 | 11 |
| 123 | 90 | 22 | 90 | 60 | 90 | 98 | 85 | 36 | 85 | 74 | 80 | 12 |
| 124 | 90 | 23 | 90 | 61 | 90 | 99 | 85 | 37 | 85 | 75 | 80 | 13 |
| 125 | 90 | 24 | 90 | 62 | 90 | 100 | 85 | 38 | 85 | 76 | 80 | 14 |
| 126 | 90 | 25 | 90 | 63 | 85 | 1 | 85 | 39 | 85 | 77 | 80 | 15 |
| 127 | 90 | 26 | 90 | 64 | 85 | 2 | 85 | 40 | 85 | 78 | 80 | 16 |
| 128 | 90 | 27 | 90 | 65 | 85 | 3 | 85 | 41 | 85 | 79 | 80 | 17 |
| 129 | 90 | 28 | 90 | 66 | 85 | 4 | 85 | 42 | 85 | 80 | 80 | 18 |
| 130 | 90 | 29 | 90 | 67 | 85 | 5 | 85 | 43 | 85 | 81 | 80 | 19 |
| 131 | 90 | 30 | 90 | 68 | 85 | 6 | 85 | 44 | 85 | 82 | 80 | 20 |
| 132 | 90 | 31 | 90 | 69 | 85 | 7 | 85 | 45 | 85 | 83 | 80 | 21 |
| 133 | 90 | 32 | 90 | 70 | 85 | 8 | 85 | 46 | 85 | 84 | 80 | 22 |
| 134 | 90 | 33 | 90 | 71 | 85 | 9 | 85 | 47 | 85 | 85 | 80 | 23 |
| 135 | 90 | 34 | 90 | 72 | 85 | 10 | 85 | 48 | 85 | 86 | 80 | 24 |
| 136 | 90 | 35 | 90 | 73 | 85 | 11 | 85 | 49 | 85 | 87 | 80 | 25 |
| 137 | 90 | 36 | 90 | 74 | 85 | 12 | 85 | 50 | 85 | 88 | 80 | 26 |
| 138 | 90 | 37 | 90 | 75 | 85 | 13 | 85 | 51 | 85 | 89 | 80 | 27 |

As can be seen from table II above, this arrangement is simpler and more consistent than that illustrated in table I. All of the subassemblies in each segment have the same helium/neon ratio, while each segment is rotationally the same as the others as far as location of subassemblies having the same neon-20, neon-22 ratio. Thus, there is less likelihood of erroneous assembly of the core, and the mass-spectrometer analysis will be easier to use, since neon/helium ratio will identify the core segment and neon-20, neon-22 ratio will identify the subassembly within that segment which is leaking.

Further variations on these arrangements of specific gas mixtures will occur to those skilled in the art. If the number of subassemblies is very great, a third inert gas may be added to the gas mixture in varying quantities. Although the arrangements illustrated above described specific proportions of specific inert gases, other suitable gases, as described above, may be used with similar results. The mixture of filler gas and indicating gas or the fuel material may contain other materials to enhance or otherwise modify their properties.

Other modifications and ramifications of the present invention will occur to those skilled in the art upon reading the present disclosure. These are intended to be included within the scope of this invention.

We claim:

1. The method of detecting leaking clad fuel bodies in a nuclear reactor core having a plurality of clad fuel bodies which comprises the steps of:
   a. initially including in each clad fuel body a mixture comprising an inert nonradioactive elemental filler gas and an inert elemental indicating gas, said indicating gas comprising a mixture of at least two stable isotopes of said element, with at least one of (1) the mass ratio of said filler gas to said indicating gas and (2) the mass ratio of said at least two isotopes in each clad fuel body being different from those in the other clad fuel bodies in said core; and
   b. monitoring off-gas from said reactor core by mass spectrometry, whereby a leaking clad fuel body is detected and located by elemental and isotopic analysis of said off-gas.

2. The method according to claim 1 wherein at least two clad fuel bodies contain gas mixtures differing in the mass ratio of filler gas to indicating gas.

3. The method according to claim 1 wherein at least two clad fuel bodies contain gas mixtures differing in mass ratio of said at least two isotopes of said indicating gas.

4. The method of claim 1 wherein said clad fuel bodies are grouped in a plurality of subassemblies and all of the clad fuel bodies in each individual subassembly contain a substantially identical mixture of said filler gas and said indicating gas.

5. The method of claim 1 wherein said filler gas is helium and said indicating gas comprises a mixture of neon-20 and neon-22.

6. The method of claim 1 wherein spaces between fuel and cladding are filled with a metal selected from the group consisting of sodium, potassium and mixtures thereof, and said gas mixture occupies a plenum space at one end of said clad fuel body.

7. The method of detecting leaking clad fuel bodies in a nuclear reactor core having a plurality of clad fuel bodies arranged in a plurality of subassemblies, which comprises the steps of:
   a. initially including in each clad fuel body a mixture comprising an inert nonradioactive elemental filler gas and an inert elemental indicating gas, said indicating gas comprising a mixture of at least two stable isotopes of said element, said gas mixture being the same in each clad fuel body in each individual subassembly and said gas mixture being different in the clad fuel bodies in different subassemblies; and
   b. monitoring off-gas from said reactor core during operation of said reactor by mass spectrometry, whereby gas leaking from a ruptured clad fuel body is detected and the location of the subassembly containing the leading clad fuel body is determined by elemental and isotopic analysis of said off-gas.

8. The method according to claim 7 wherein clad fuel bodies in at least two subassemblies contain gas mixtures differing in the mass ratio of said at least two isotopes of said elemental indicating gas.

9. The method according to claim 7 wherein clad fuel bodies in at least two subassemblies contain gas mixtures which differ in their mass ratio of filler gas to indicating gas.

10. The method of claim 7 wherein said filler gas is helium and said indicating gas comprises a mixture of neon-20 and neon-22.

11. The method of claim 7 wherein spaces between fuel and cladding are filled with a metal selected from the group consisting of sodium, potassium and mixtures thereof, and said gas mixture occupies a plenum space at one end of said clad fuel body.

12. A clad nuclear fuel body comprising:
   a. a closed hollow cladding container;
   b. the major portion of said container filled with fissile fuel material; and
   c. the remainder of said container initially filled with a mixture of an inert nonradioactive elemental indicating gas, said indicating gas comprising a mixture of at least two stable isotopes of said element.

13. The clad nuclear fuel body of claim 12 wherein spaces between fuel and cladding are filled with a metal selected from the group consisting os sodium, potassium and mixtures thereof and said gas mixture fills a plenum space located at one end of said body.

14. The clad fuel body according to claim 12 wherein said filler gas is helium and said indicating gas comprises a mixture of neon-20 and neon-22.

* * * * *

UNITED STATES PATENT OFFICE
CERTIFICATE OF CORRECTION

Patent No. 3,632,470      Dated January 4, 1972

Inventor(s) Bernard F. Rubin, Charles L. Larson and Leonard N. Grossman

It is certified that error appears in the above-identified patent and that said Letters Patent are hereby corrected as shown below:

Column 3, line 27, after "100" insert --percent--; line 30, after "$Ne^{20}$" delete "mixture"; line 31, after "15" insert --percent--; line 32, after "85" insert --percent--; and line 53, "lead" should be --leak--. Column 4, line 51, "reactor" should be --reactors--. Column 6, lines 14 and 15, delete "However, each segment as a whole has a same neon-20, neon-22 ratio"; line 40, delete "L" before the heading --Segment--; and line 41, under "Helium" the first number should be --95--. Column 8, line 20, "leading" should be --leaking--; line 43, "elemental filler gas and an inert" should be inserted after "non-radioactive"; and line 48, "os" should be --of--.

Signed and sealed this 11th day of July 1972.

(SEAL)
Attest:

EDWARD M. FLETCHER, JR.
Attesting Officer

ROBERT GOTTSCHALK
Commissioner of Patents